April 17, 1928. 1,666,719
J. P. SCOVILL
TOBACCO STEMMING MACHINE
Filed July 18, 1921 6 Sheets-Sheet 1
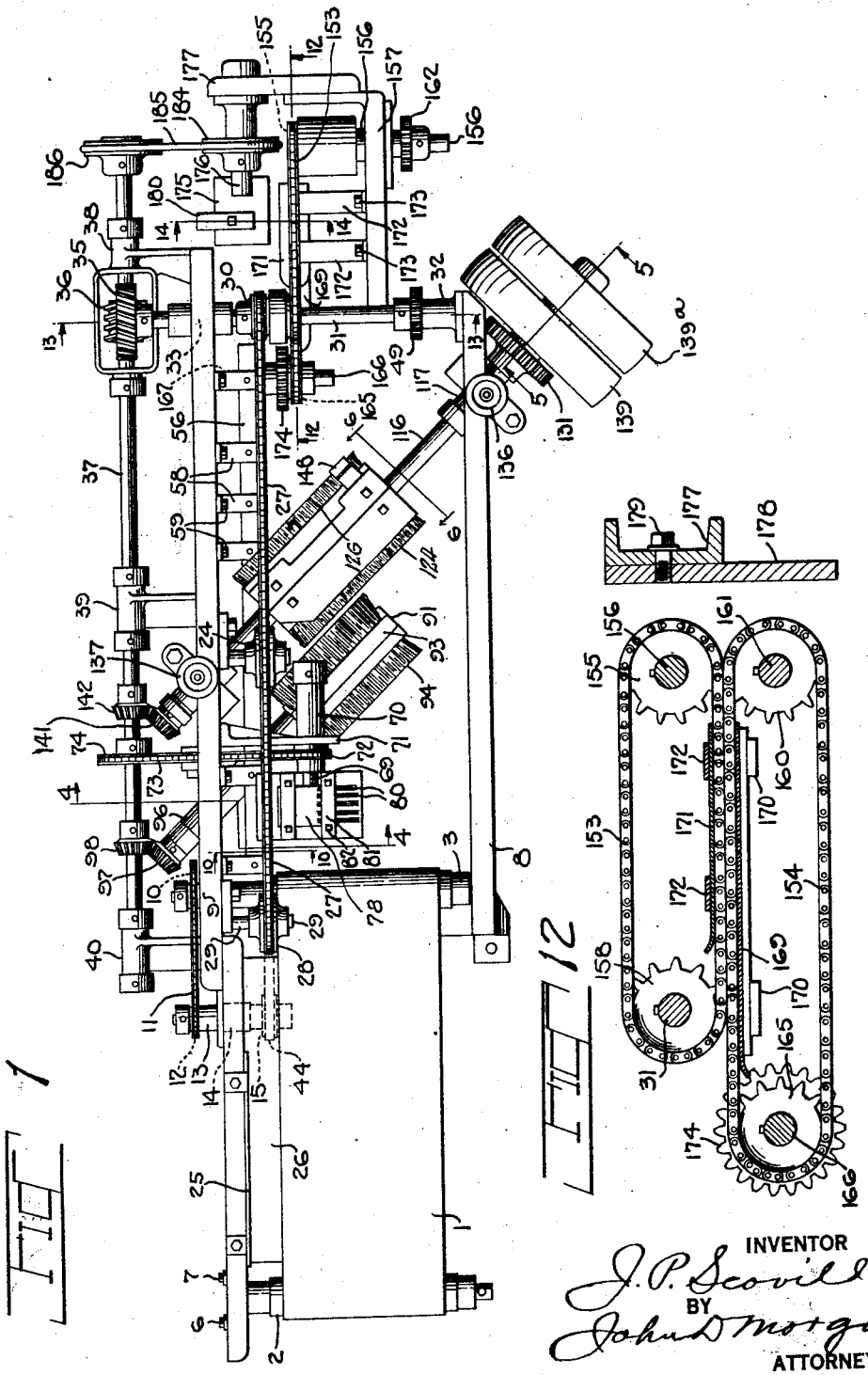
INVENTOR
J. P. Scovill
BY
John D. Morgan
ATTORNEY

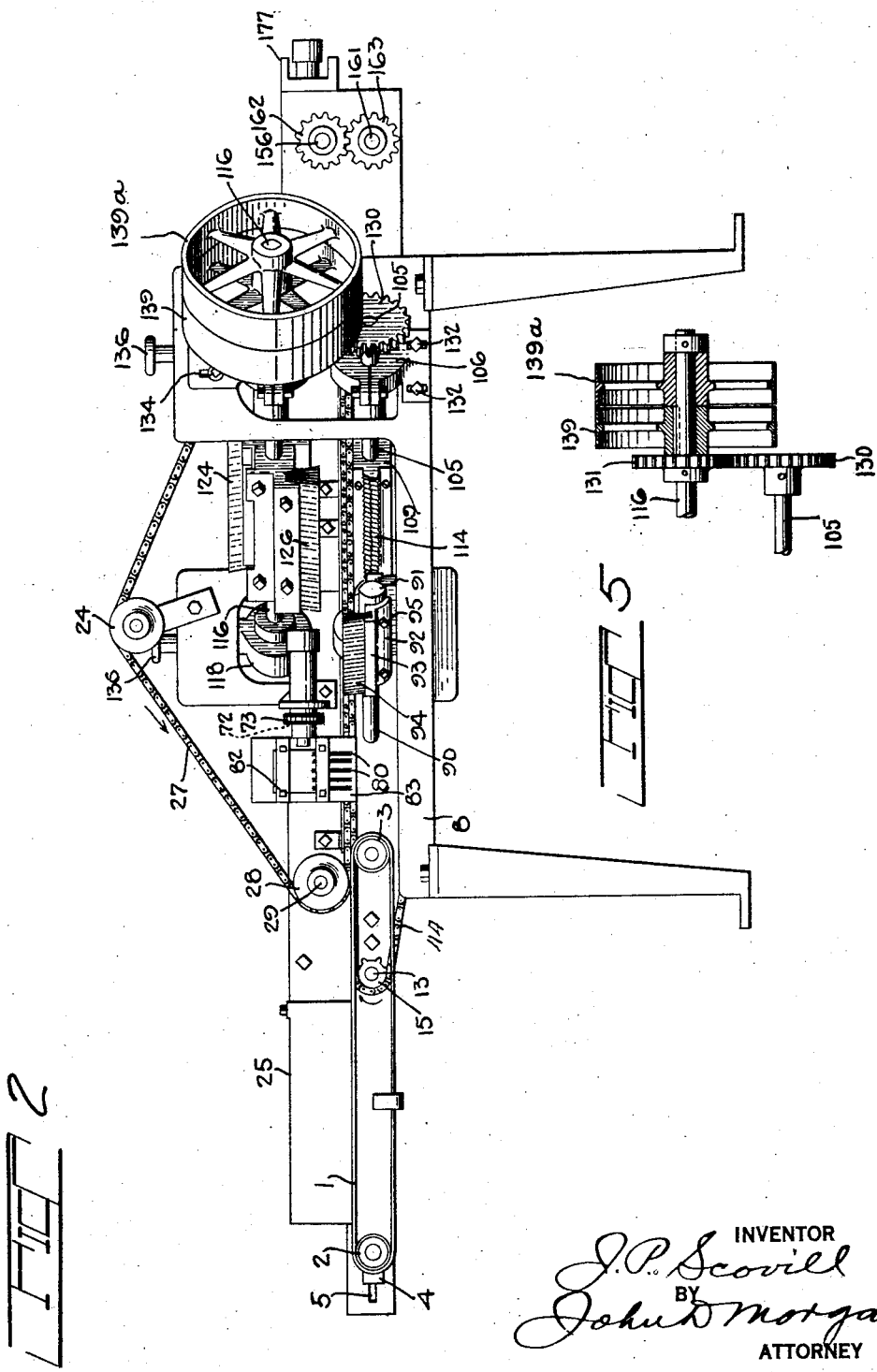

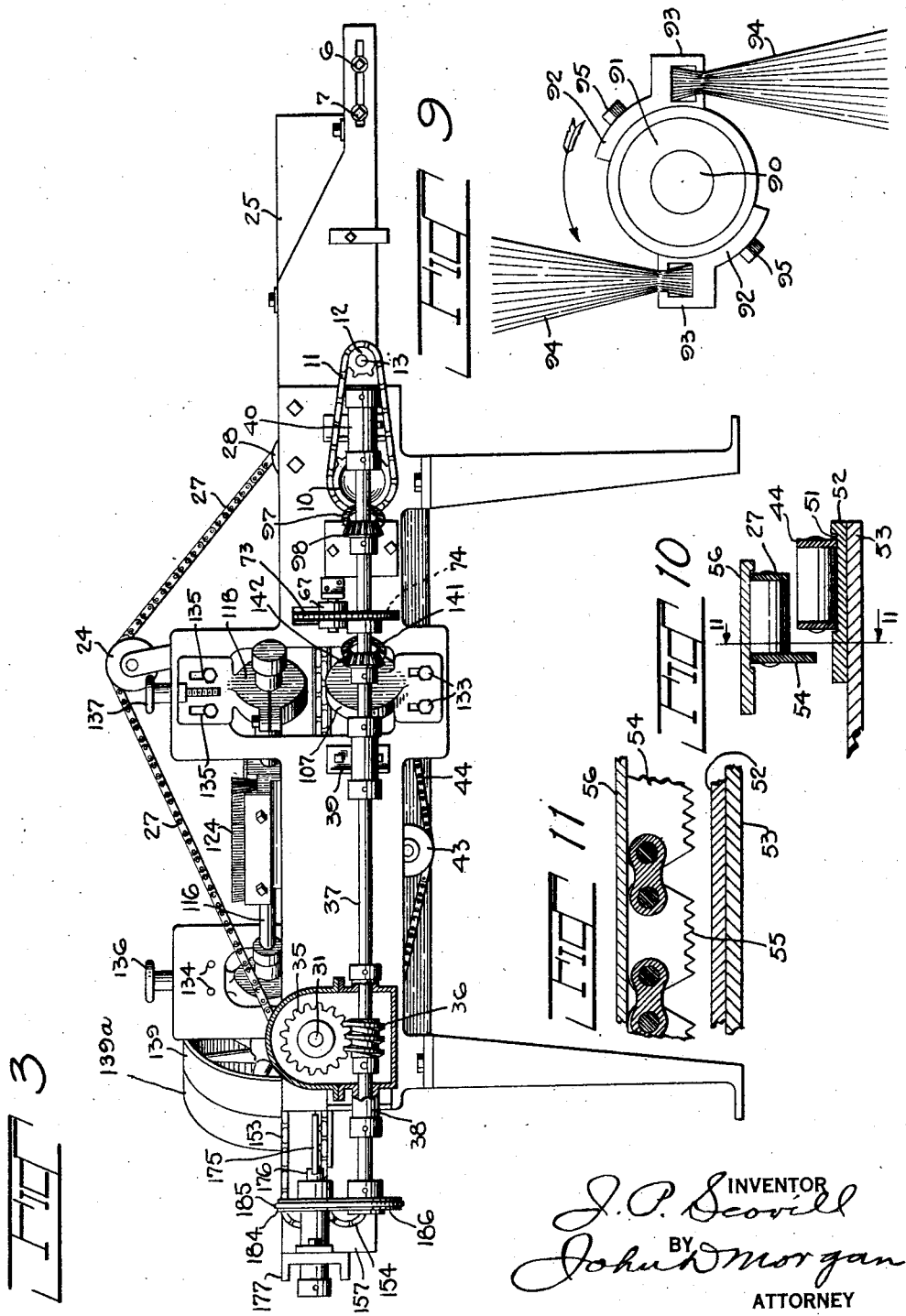

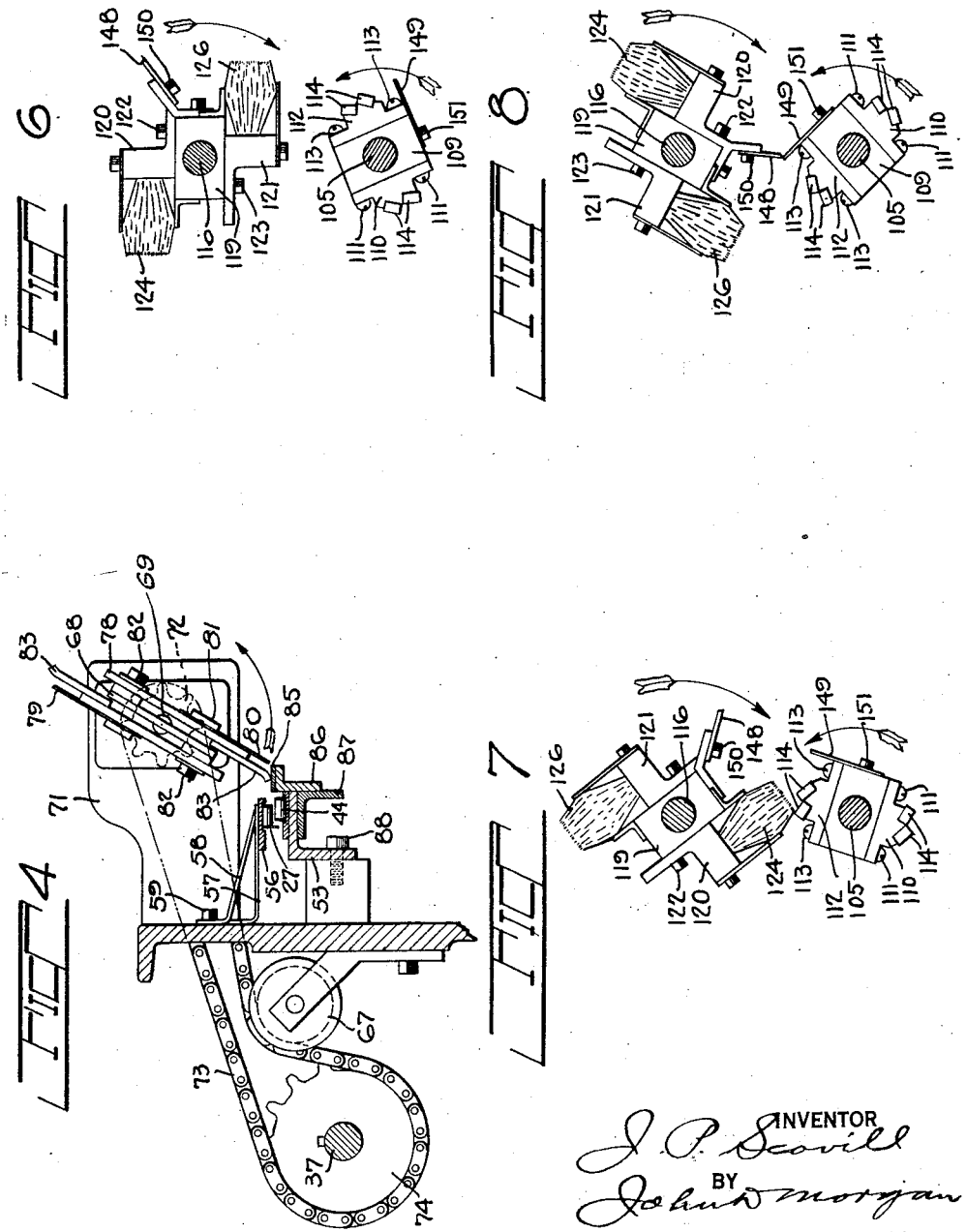

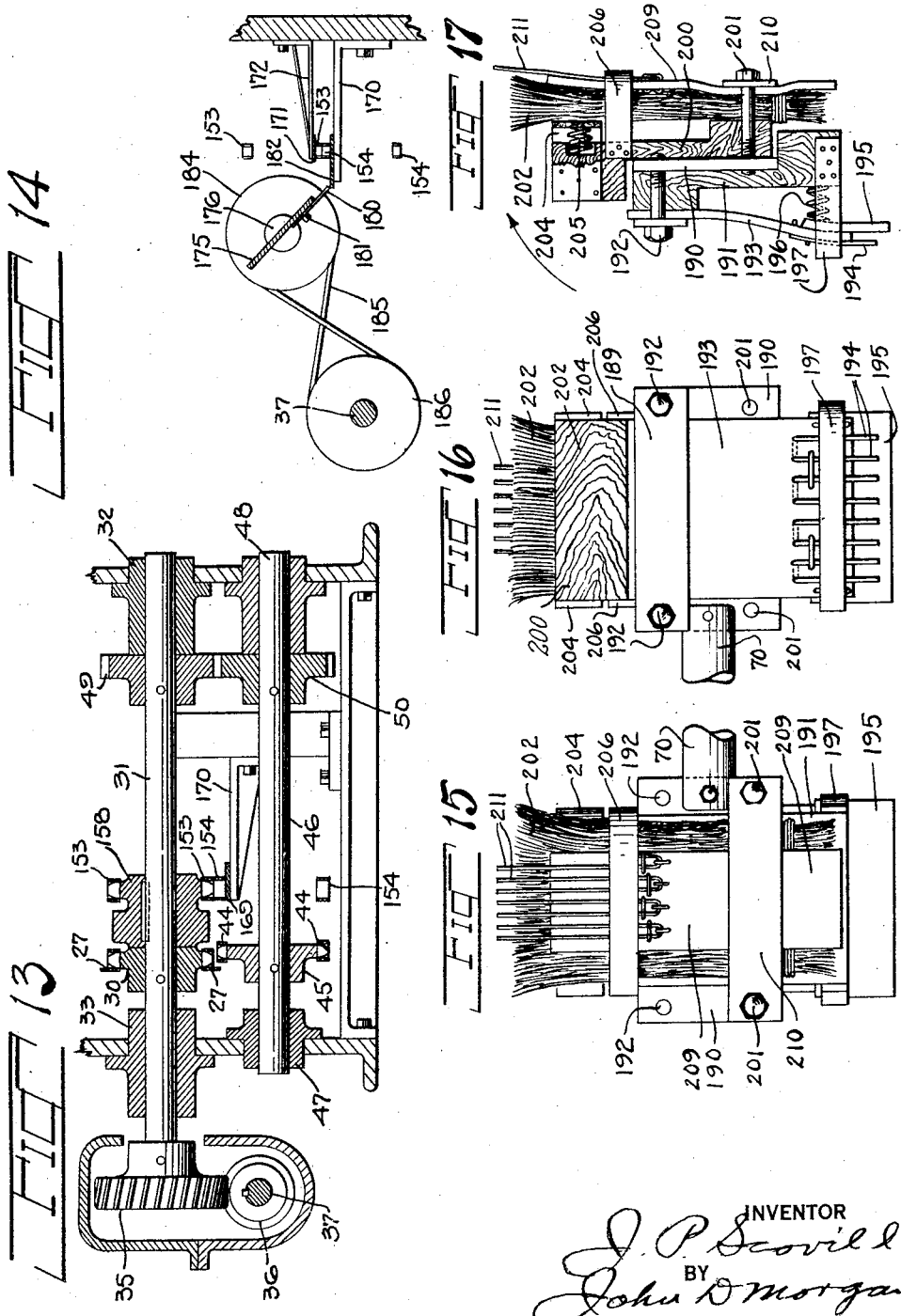

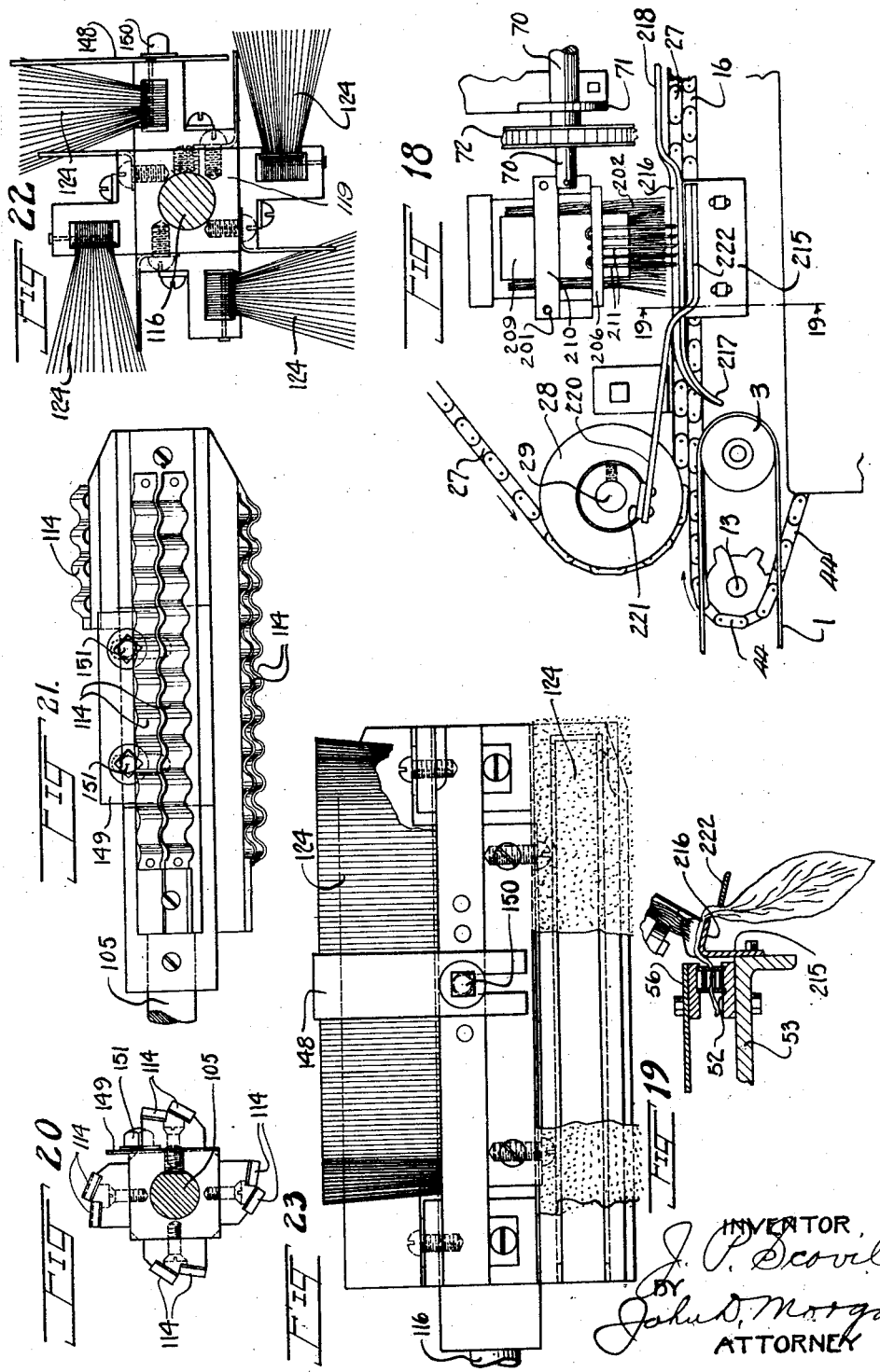

Patented Apr. 17, 1928.

1,666,719

UNITED STATES PATENT OFFICE.

JAMES P. SCOVILL, OF TROY, NEW YORK, ASSIGNOR, BY MESNE ASSIGNMENTS, TO PEERLESS MACHINE CORPORATION, OF NEW YORK, N. Y., A CORPORATION OF DELAWARE.

TOBACCO-STEMMING MACHINE.

Application filed July 18, 1921. Serial No. 485,596.

The invention relates to tobacco stemming machines, and more particularly to machines for stemming the entire leaf at a single operation and in one direction along the leaf stem.

Objects and advantages of the invention will be set forth in part hereinafter and in part will be obvious herefrom, or may be learned by practice with the invention, the same being realized and attained through the instrumentalities and combinations pointed out in the appended claims.

The invention consists in the novel parts, constructions, arrangements, combinations and improvements, herein shown and described.

The accompanying drawings, referred to herein and constituting a part hereof, illustrate one embodiment of the invention, and together with the description serve to explain the principles of the invention.

Of the drawings:—

Fig. 1 is a top plan of a tobacco stemming machine embodying the invention;

Fig. 2 is a side elevation of the machine, looking thereat from the lower side as shown in Fig. 1;

Fig. 3 is a side elevation of the machine, looking thereat from the top side as shown in Fig. 1 and from the back of Fig. 2;

Fig. 4 is a fragmentary, detail vertical section, greatly enlarged, taken on the line 4—4 of Fig. 1, showing the breaking-through or starting mechanism, looking in the direction of the arrows;

Fig. 5 is a fragmentary, detail vertical section, taken on the line 5—5 of Fig. 1, showing the drive for the stemming rollers;

Fig. 6 is a fragmentary, detail vertical section, on an enlarged scale, taken on line 6—6 of Fig. 1, and showing the stemming rollers in elevation, and with the stemming devices out of engagement, as when the leaf enters, and between successive stemming operations;

Fig. 7 is a similar view to Fig. 6, but showing the mechanism during the engagement together or coaction of the stemming devices, on the cooperating stemming rollers, to stem the leaf passing therebetween;

Fig. 8 is a similar view to Figs. 6 and 7, but shows the mechanism with the stem cutting devices on the stemming rollers coacting to cut off the stem;

Fig. 9 is a detached detail, in end elevation and greatly enlarged, of the brushing roller which separates out any broken stemmed leaf;

Fig. 10 is a fragmentary detached detail view, in vertical section, and greatly enlarged, taken on line 10—10 of Fig. 1, and showing the cooperating leaf conveying chains;

Fig. 11 is a vertical longitudinal section, taken on the line 11—11 of Fig. 10;

Fig. 12 is a detached, detail vertical longitudinal section, greatly enlarged, taken on line 12—12 of Fig. 1, and showing the cooperating delivery chains for the cleaned stems;

Fig. 13 is a fragmentary elevation in vertical, transverse section, with the shafts in elevation, on an enlarged scale, and taken on the line 13—13 of Fig. 1;

Fig. 14 is a fragmentary transverse vertical section, on an enlarged scale, taken on line 14—14 of Fig. 1, and showing the stem cleaning devices;

Fig. 15 is an enlarged, detail, front elevation of the present preferred form of the device for preliminarily breaking through the leaf to start the stemming action;

Fig. 16 is an enlarged, detail, back elevation of the device shown in Fig. 15, that is, looking at Fig. 15 from the back;

Fig. 17 is an enlarged, detail, side elevation, with certain parts in section, of the device shown in Figs. 15 and 16, and looking at Fig. 15 from the left.

Fig. 18 is a fragmentary elevation, on an enlarged scale, showing the device of Figs. 15, 16 and 17, together with the cooperating leaf support and guides, and other cooperating parts, and corresponds to the left central part of Fig. 2;

Fig. 19 is a section on the line 19—19 of Fig. 18;

Fig. 20 is a detail end elevation of the present preferred form of the relatively less resilient or plate stemming member, one form of which is shown in Figs. 6, 7 and 8;

Fig. 21 is a detail side elevation, looking at Fig. 20 from the right;

Fig. 22 is a detail elevation of the present preferred form of the yielding or brush stemming member, one form of which is shown in Figs. 6, 7 and 8; and Fig. 23 is a detail side elevation looking at Fig. 22 from the right.

The invention is directed primarily to a unidirectional or one way stemming of the entire tobacco leaf, whereby, starting at the stem end, and by a substantially continuous operation in one direction only from an initial break, all the leaf is cleaned from the stem, beginning at the butt end and stemming toward the tip to such a point or place where it is desired to cut off the stem and thereby stop the stemming operation. In connection with the foregoing stemming means, leaf conveying, that is, stem engaging and leaf conveying devices are provided, which are adapted to present an always open entrance or receiving means for the leaf, whereby the leaf stems need not be presented separately, nor straightened nor spaced apart, nor otherwise specially arranged or disposed to be taken by the conveying means. Nor do the stem butts have to be preliminarily cleaned as a prerequisite to be taken by such stem-engaging, leaf-conveying means.

The quantity or relative position or order of the leaf and stems fed to such means is not restricted or circumscribed, except within very wide limits, whereby the machine may be crowded or pushed to a very high limit of output without appreciable or objectionable deterioration in the quality of work performed.

In effecting the uni-directional stemming of the leaf, thereby taking off all the leaf from the butt toward the tip of the stem, until the point or place where the stem is cut off, means are provided for preliminarily starting or initially breaking through the fiber of the leaf at each side of, and closely adjacent to the stem, substantially where the leaf begins on the stem butt.

This operation, in accordance with one feature of the invention, is preparatory and preliminary to the stemming or separation of the leaf from the stem by the stemming devices. The purpose is to break free the leaf from the stem, at the point or place of beginning of the leaf fiber on the stem butt, so as to leave little or no leaf fiber on the stem back of the place of such breaking through or starting of the separation of stem and fiber, and also to destroy the tensile resistance which the leaf would offer to uni-directional stemming beginning at the butt unless such breaking through or starting of the fiber were effected.

By completely stemming the leaf in what is in effect a continuous uni-directional operation, with the leaf held in a single mechanism throughout the operation, the transfer of the leaf from one mechanism to another is avoided. The invention thus provides a very simple and very efficient machine, relatively inexpensive, and with a very large capacity. It is able to care for crowding and overloading with practically no droppings.

Other objects, features and advantages of the invention will be set forth in connection with the following detailed description of the present preferred and exemplary embodiment of the invention.

Referring now in detail to such present preferred embodiment of the invention, as illustrated in the accompanying drawings, the machine is provided with preliminary means for receiving the tobacco leaves and conveying them forward to the stemming mechanism. The tobacco is usually supplied in "hands", the "hands" being broken apart by an attendant and freely distributed along the preliminary conveying means.

As embodied, such means comprise a horizontally disposed, endless traveling belt 1, of a width preferably greater than the length of a tobacco leaf, the leaf being strewn by hand freely along the belt 1, after the "hands" are broken open, without necessity for any regular spacing or exact disposition of the leaf, or straightening or specific arrangement of the stems, as the leaf can be irregularly disposed along the belt, and the stems may lie just as they fall, and they are conveyed entirely through the machine in this irregular manner, the stemming operation being successively and efficiently performed upon the leaf as so fed. This enhances greatly the product of the machine, reduces the labor of feeding the machine, simplifies the mechanism and reduces the number of attendants required, and enables the machine to be crowded and its output is greatly increased, when there is occasion or demand for this. These advantages are realized through the construction, capacities and manner of operation of the stemming devices, and the cooperating conveying means for carrying the leaf therethrough, and of the other mechanisms cooperating with the foregoing.

The endless belt 1 at one end thereof runs over an idler roller 2, and over a driven roller 3 at the other end thereof. The idler roller 2 has its shaft journaled in a bearing mounted in a block 4, which block is slidable in a slot 5 in the machine frame, thereby to adjust the tension of the belt, the block 4 being held in such adjusted position by clamping screws 6 and 7.

The roller 3, as shown, is journaled at 8 and 9 in the machine frame, and the shaft thereof is provided with a sprocket wheel 10. A sprocket chain 11 runs over the wheel 10 and over a sprocket wheel 12 fixed on a shaft 13. The shaft 13 is supported or journaled at 14 in the machine frame, and fixed to the other end thereof is a spocket wheel 15. Running over the sprocket wheel 15 is a sprocket chain 44 which will be later described in connection with the mechanism for conveying the leaf through the stemming mechanism.

A suitable gage is provided for alining the tobacco leaf longitudinally, so that when it is taken by the conveying mechanism which carries it through the stemming devices, the stem is grasped in position to present the entire leaf to the stemming devices, whereby the leaf is stemmed in one direction only and by a single operation from the place where the web or lamina of the leaf begins to project from the stem butt downwardly toward the tip of the leaf to such point where the stem is usually cut off, thus terminating the stemming action upon the leaf. As embodied, a vertical gage 25 is mounted upon the machine frame alongside the horizontal traveling belt 1, and at the foot of the gage 25 is a horizontally extending plate 26 which preferably extends beneath the adjacent longitudinal edge of the belt 1, and acts as a support therefor.

A single conveying means is provided for grasping the stem butts adjacent to the beginning point of the leaf fiber and carrying the leaf through the stemming mechanism which completely stems the leaf while it is grasped by a single mechanism. Said conveying means is preferably of a form which is continuously open to receive the leaves as fed thereinto, that is, the leaves are taken just as and when they come, without the intervention of spacing, straightening or timing mechanism, and are grasped in irregular order and conveyed past and through the stemming devices or mechanism. As embodied, this leaf feeding means, which so grasps the uncleaned or unprepared stems, comprises two sprocket chains, with their adjacent reaches running in contact or superposition, the leaf stems entering therebetween and being thereby grasped and conveyed through the stemming means.

As embodied, an endless sprocket chain 27 runs over an idler sprocket wheel 28, journaled on a shaft 29, which shaft is fixed to the machine frame. The chain 27 also runs over a driven sprocket wheel 30, fixed on a shaft 31, which shaft is journaled at 32 and 33 in the machine frame. The shaft 31 is driven in a suitable manner, and as shown, it has fixed to one end thereof a worm wheel 35. Worm wheel 35 meshes with a worm 36, fixed on a shaft 37, which shaft is journaled in brackets 38, 39 and 40 supported on the machine frame. The shaft 37 is driven in a manner which will be later described. A guiding and tensioning pulley or wheel 24 may be provided for the chain 27.

Cooperating with the sprocket chain 27 is an endless sprocket chain 44, the upper reach thereof running in cooperative relation with the lower reach of the sprocket chain 27 to grasp and convey the tobacco leaves by their stems, as already described. Sprocket chain 44 runs over the sprocket wheel 15, which provides the supporting and positioning means for the chain at its forward or entering end, and also drives the roller 3 and thereby the belt conveyor 1, as already described. At its rear end, chain 44 runs over a driven sprocket wheel 45, Fig. 13 fixed on a shaft 46, which shaft is journaled at 47 and 48 in the machine frame. Shaft 46 is driven from shaft 31 by means of a gear wheel 49 fixed to shaft 31, with which meshes a gear wheel 50, fixed on shaft 46 (Figs. 1 and 13). A guiding and tensioning roller 43 may be provided for chain 44 if desired.

In the embodied form of conveying means, the upper reach of the chain 44 runs in a guideway 51 formed in a plate 52 extending along and beneath the top reach of the sprocket chain 44, and is carried by supports 53, fixed to the machine frame by bolts 88 (Figs. 4, 10 and 11). The lowermost reach of the chain 27 and the top reach of the chain 44 are preferably transversely staggered with respect to each other, as shown in Fig. 10, thereby providing a flexing grip on the stems. The chain 27 is preferably provided also with stem engaging plates 54, arranged along the outer side thereof, and extending downwardly beyond the level of the top of the chain 44 and provided with serrations 55. These serrations tend to hold the leaf stems and to prevent longitudinal shifting and pulling thereof, which might otherwise result from the stems being often crooked and superposed one over another in passing through the stemming mechanism.

Suitable means are provided for placing or imposing pressure upon the leaf engaging reaches of the conveying chains 27 and 44, especially when the leaf is subject to the pull due to passing through the stemming mechanism. As embodied, a plate 56 presses upon the top of the lower reach of the chain 27 (Figs. 1, 4 and 10 and 11), and means are provided for imposing upon plate 56 a yielding and adjustable pressure. For this purpose, the plate 56 is supported on a plurality of spring arms 57, which are bent or angled upwardly and are supported upon the machine frame. Fixed also to the plate 56 are a plurality of resilient presser arms 58, the other ends thereof being bent upwardly to engage with the machine frame, and being provided with adjusting bolts 59, whereby the pressure of the arms 58 upon plate 56 can be severally and individually regulated to control the pressure at the corresponding separate points upon the chain 27 and the chain 44.

Means are provided by the invention, as previously indicated, for starting the stemming action just at the point where the leaf fiber begins from the stem butt, that is, for breaking through the leaf fiber at this point, so that when the stemming devices begin their action upon the leaf, the tensile resistance of the leaf to the action of the stemming devices has been broken or destroyed. As embodied (Figs. 1, 2 and 4) said means comprises a dentated member, operating preferably toward the leaf tip, and piercing the leaf fiber at either side of the stem and substantially where the leaf fiber starts out from the stem butt. Preferably in cooperation therewith, is a yielding member which slightly brushes or smooths the broken-through or started leafway from the stem butt. In detail, a plate 68 is fixed on a shaft 69, which shaft is journaled in a bearing 70, carried on a bracket 71 fixed to the machine frame. Fixed on shaft 69 is a sprocket wheel 72 over which runs a sprocket chain 73, the chain running also over a sprocket wheel 74 fixed on the shaft 37, previously described. A guiding and tensioning pulley 67 is provided for chain 73. Mounted on plate 68 is a plate 78 which carries the dentated breaking through or leaf starting device. This consists as embodied of a plurality of short rigid wires 80, clamped between the plate 78 and a cross piece 81, which is held to plate 78 by clamping screws 82. Supported also on the plate 78 is the yielding brushing member 83, already referred to, which may be used or not as desired. The mechanism described is preferably in duplicate on both sides of the carrier plate 68, a single description thereof being sufficient. Cooperating with the foregoing mechanism in the breaking-through or leaf starting operation is a plate or stem supporting member or plate 85 (Fig. 4), mounted upon a support 86, which is carried on a bracket 87, fixed on the supporting member 53 for the sprocket chain 44 (already described), which latter is supported on a machine frame by screw bolts 88.

In the operation of the mechanism just described, shaft 69 is driven from the shaft 37 by the sprocket chain 73. As shaft 69 rotates, the dentated members 80 are rotated in the direction of the arrow in Fig. 4, that is, along the tobacco leaf and towards the tip thereof. The stems are firmly held between the sprocket chains 27 and 44, and lie over the edge of the plate 85, at which point the leaf begins to grow out of the stem. The leaf breaking or starting members 80 pass through the leaf fiber at this point and at either side of the stem, and break it across, thereby destroying any connection whereby the leaf fiber would exert a pull against the stemming devices that would resist an easy and clean stemming action.

Means are preferably provided for culling out any broken stemmed leaf before it enters the stemming devices and thus preventing it becoming mixed with the clean stemmed leaf. As embodied, a shaft 90 Figs. 2 and 9 has fixed thereto a carrier 91, shown of cylindrical form. Mounted upon the carrier 91 are two holders 92, preferably directly opposite. Each of these holders is provided with a recessed portion 93, adapted to hold a series of bristles 94, disposed along the carrier 91 and arranged tangentially thereto. The holders 92 are fastened to the carrier 91 by screw bolts 95, which also may provide suitable adjustment therefor. The shaft 90 is journaled in the machine frame at 96, and at the rear end thereof it has fixed thereto a beveled gear 97, which meshes with a beveled gear 98, fixed on shaft 37. Shaft 90 is thus driven from shaft 37, and rotates in the direction shown by the arrow in Fig. 9.

Shaft 90 is located beneath the path of travel of the tobacco leaf through the machine, and by reason of the position of the bristles 94 they engage the oncoming leaf in the grasp of the conveyor chains 27 and 44 from beneath and in a backwardly inclined relation, and exert a mild brushing action thereagainst from the underside sufficient to dislodge any leaf with broken stems and to throw it down in a suitable chute or other receptacle which will keep it separate from the stemmed leaf. The shaft 90 is preferably arranged diagonally to the conveyor chain, and preferably parallel with the stemming devices.

The form of stemming means shown herein is the same as that shown in my copending application Pat. No. 1,388,487, but with some modifications or improvements therein which will be claimed herein. So far as concerns certain features of the invention, however, other forms of stemming means could be employed.

Referring now to the embodied form of the stemming means, and referring primarily to the lower device, that is the device operating upon the leaf from beneath, a shaft 105 Fig. 2, is journaled in bearings 106 and 107 on the machine frame, and is disposed diagonally with respect to the conveyor chains 27 and 44. Mounted on shaft 105 is the carrier 109 for the stemming plates. As embodied, the stemming plates consists of two diametrically separated groups of two plates each, one group 110 Fig. 6, being mounted by holding and adjusting screws 111 upon one side of the carrier 109, and the other group 112 being mounted by holding and adjusting screws 113 upon the other side of the carrier 109. In the embodied and present preferred form of the stemmer plates, they constitute respectively a series of stem receiving grooves extending transversely of and arranged longitudinally of, their carrier, and being thus arranged diagonally or at an acute angle to the leaf conveyors, presenting the forward edge of the plates so grooved to the advancing leaf to stem the leaf.

The plates 114 are preferably of sinusoidal form when viewed edgewise, although other forms will be found efficient, and they are disposed longitudinally of and parallel to the shaft 105, and are inclined outwardly, that is, the forward or stemming edge is at a slightly greater distance from the shaft than the rear edge of the plate. The plates are preferably arranged parallel to each other and one in the rear of another, the inclination just described permitting each plate in this position to present its front edge to act upon the leaf during the stemming operation.

Cooperating with the device just described from the opposite, and preferably the upper side of the conveyed leaf is the other stemming device. As embodied, this comprises a shaft 116, Figs. 1, 6 and 8 journaled at 117 and 118 in the machine frame. Shaft 116 is located just above and parallel to the shaft 105, and fixed to shaft 116 is a carrier 119. Mounted on the carrier 119, and preferably directly opposite, are two supporting members 120 and 121, adjustably fixed to the carrier 119 by screw bolts 122 and 123. Mounted in each of the supports 120 and 121, respectively, are yielding stemming devices, preferably a group of bristles 124 and 126, of considerable thickness, and extending longitudinally of the carrier 119 and the shaft 116, and also preferably disposed substantially tangentially to their direction of rotation.

The driving means for the shafts 105 and and 116 comprise a gear wheel 130, Fig. 2, fixed on shaft 105, and meshing therewith, a gear wheel 131, fixed on shaft 116. The bearings for the shafts 105 and 116 are provided with adjustments whereby the shafts may be moved toward each other or apart to regulate the action or coaction of the stemming devices. As embodied, the bearings 106 and 107 have bolt and slot connections 132, Fig. 2 and 133, Fig. 3 at their supports upon the frame. Likewise the bearings 117 and 118 have bolt and slot connections 134 and 135 at their point of support upon the frame, and are also preferably provided, respectively, with adjusting screws 136 and 137.

In the present embodiment, as a matter of convenience, the drive for the entire machine is effected primarily through shaft 116. As embodied, fast and loose belt pulleys 139 and 139ª are mounted on one end of shaft 116, and fixed to the other end of the shaft is a beveled gear 141. Meshing with the gear 141 is a beveled gear 142, fixed on shaft 37, previously described. Shaft 37 is thus driven from shaft 116, and the remaining mechanisms are driven from shaft 37, in part as already described and in part as will be described later herein.

To secure the sweeping action of the bristles, or other flexible member, over the stemming plates, the mounting for the bristle carriers 121 is made of greater radius with respect to the shaft 116 than the radial distance of the plates 114 from the shaft 105, as will be clear from Figs. 6, 7 and 8 of the drawings.

Means are provided for cutting the stems at any point where it is desired to terminate the stemming action, as it is unobjectionable to leave the slender and flexible tip end of the stem in the leaf. In the embodied form of cutting means, a blade 148 is fixed on the carrier 119, and a cooperating blade 149 is fixed on the carrier 109. These blades are adjustable lengthwise of their respective carriers by means of adjusting bolts 150 and 151. By positioning the blade lengthwise of their carriers, their distance from the conveying chains 27 and 44 are varied, and thus the point at which the stem is cut off relatively to the length of the leaf may be regulated and determined as desired. By reason of the more rapid peripheral travel of the blade 148, it overtakes the blade 149 past the center line of the two shafts 105 and 116, thereby cutting off the stem close up to the leaf, and does not leave a stub of the stem projecting from the stripped leaf.

While the machine stems the leaf at what is in effect a continuous uni-directional operation from near the point or place where the leaf starts out from the stem butt, stemming toward the point or tip of the leaf, and leaving only such very small part of the leaf as is usually most advantageously removed in the subsequent operation of thrashing the stems, yet means are provided on the machine for cleaning these relatively minute fragments of leaf from the stem during the passage of the stripped stems to a place of discharge at the rear of the machine. Usually this operation is not necessary, and this mechanism may be omitted from the machine, or may be left idle thereon, if desired.

In the embodied form of such mechanism (Figs. 1, 2, 3, 12, 13 and 14), an auxiliary leaf conveying mechanism is provided, comprising an endless sprocket chain 153, with its bottom reach running upon the top reach of a cooperating endless sprocket chain 154. Sprocket chain 153 runs over an idler sprocket wheel 155, fixed on a shaft 156, which shaft is journaled at 157 in the machine frame. At its forward end, sprocket chain 153 runs over a sprocket wheel 158, fixed on shaft 31. Sprocket chain 154 at its rear end runs over a sprocket wheel 160, fixed on a shaft 161, which is journaled in the machine frame. Fixed on shaft 156 is a gear wheel 162, which meshes with a gear wheel 163, which is fixed on shaft 161. At its forward end, sprocket chain 154 runs over a sprocket wheel 165, fixed on a shaft 166, which is journaled in a bearing supported on the back frame of the machine at 167.

The leaf-conveying reach of chain 154 runs in a supporting and guiding plate 169, carried on bracket 170, fixed on the machine frame. A presser plate 171 presses resiliently downwardly upon the cooperating stem conveying reach of the chain 153. Plate 171 is substantially like the similar plate 56 for chain 27, and is carried upon spring arms 172 fastened to the machine frame by bolts 173. A supporting device, such as a wheel 174, is shown for guiding the stems into the bite of chains 153 and 154.

The stem butt cleaning means comprises a plate 175, Figs. 1 and 14 fixed on the end of a shaft 176, which shaft is journaled in a supporting bracket 177, fixed to the frame 178, and preferably adjustably held in position by one or more bolts 179, Fig. 12. Carried upon plate 175 is a dentated member 180, held in place on the plate by one or more clamping bolts 181. The dentated member 180 cooperates with the edge of a stem supporting plate 182. The stem butts pass between member 180 while in rotation and the support 182, and the small fragments of adherent leaf are cleaned from the stem. Shaft 176 is rotated by means of a belt pulley 184 fixed on the shaft over which pulley runs a belt 185, which also runs over a belt pulley 186 on shaft 37.

The preferred form of the device for breaking through the leaf preparatory to the main stemming operation is shown in Figs. 15, 16 and 17. This breaking through device is for use on shaft 70, Fig. 1, in place of the breaking through device comprising elements 78, 80 and 81 there shown. This device comprises a holding plate 190 adapted to be bolted to the shaft 70, as shown in Figs. 15 and 16. Mounted on one side of the plate 190 is a wooden supporting block 191, attached to the plate 190 by a cross plate 189 and screw bolts 192. The block 191 is cut away at its outer end to provide space for a resiliently operating leaf-breaking member carried thereby.

Said leaf-breaking member, as embodied, comprises a sheet or strip 193 of suitable resilient material, such as sole leather, which at its inner end is held in position by the plate 189 holding it against the block 191. At the outer or free end thereof, sheet 193 has fixed thereto a series of leaf-breaking fingers 194, consisting preferably of stiff steel wire, attached to the sheet or strip 193. On the back of the outer end of the strip 193 is a depending strip 195, which may also be of sole leather, and behind the strip 195 are a series of spiral springs 196, located between the strip 195 and the block 191. A retaining band 197, which may be of leather, encircles the strip or sheet 193, and at its ends is fastened to the block 191, as shown in Fig. 17. This serves to limit the outward movement of the fingers 194, and to keep the entire flexible structure against the springs 196.

In accordance with one feature of the invention, the breaking or starting device is provided with other or additional means for operating on the leaf. As shown, upon the opposite side of the base plate 190 is a block 200, which is held to the base plate by a cross plate 210 and screw bolts 201. This block is cut away toward its outer end to provide room for the resilient action of the leaf-breaking members. Mounted on the block 200 is a series or group of bristles, or similar devices, 202, which are fixed to the block 200 at their inner end by means of the cross plate 210 and screw bolts 201.

Additional resilient action is provided for the group of bristles 202, and as embodied, a strip of yielding or resilient supporting material is provided behind the group of bristles and is shown as a strip of leather 204, fastened at its ends to the block 200 and extending entirely across the back of the group of bristles 202 near the outer end thereof.

Behind the supporting strip 204 is a series of spiral springs 205, bearing against the back surface of the strip 204 and nested in apertures in the plate 200. A retaining strip for limiting the outward movement of the group of bristles is provided, and as shown, a leather strip 206 passes around the outer side and the ends of the group of bristles, and is attached at its ends to the block 200.

Preferably, additional breaking means are provided, and for this purpose a strip or sheet of leather 209 is longitudinally disposed on the outside of the group of bristles 202. This is held in place by the pressure of the plate 210. This resilient strip 209, of leather or similar material, extends longitudinally to nearly the end of the group of bristles 202 and at that end it carries a plurality of projecting breaking fingers 211, which may be of stiff wire, and which project outwardly in front of, and preferably a little farther than, the group of bristles.

By this mounting the wire or other rigid leaf breaking members are flexibly mounted, which guard against their breaking in use, and gives a better action, as it provides the rigid breaking members and at the same time a resilient action therefor.

In Figs. 20 and 21 there is shown a form of the relatively rigid, or corrugated plate, stripping member having four series of plates thereon, which are of various or graduated lengths, as best appears from Fig. 21, for the purpose of giving a graduated or variable stemming action. The various parts have been generally described heretofore, and further description will be unnecessary, the same reference numerals being applied to these figures as to the corresponding parts shown in the preceding figures of the drawings.

In Figs. 22 and 23 the present preferred form of relatively yielding and relatively less rigid stemming means is shown for use on shaft 116, Fig. 1. In this construction, four longitudinally-disposed groups of bristles or similar devices are shown, corresponding to the four groups of stripping plates, shown in Figs. 20 and 21. This gives a much more rapid and more delicate stemming action for any given speed of the machine.

In Figs. 6, 7, 8 and 22, the group of bristles, fiber, or other stemming members, are arranged tangentially or off center with respect to their axis of rotation. The fibre, bristles, or other stemming members when so arranged, instead of coming in contact with the leaf at right angles thereto, by being so tangentially disposed, strikes the lower roll in an inclined position, or at an oblique angle. The stemming is very much milder than when the fiber points are forced against the leaf, and at the same time it is more efficient, and the strips have a better appearance, and the breakage and drop leaf is less.

In accordance with one feature of the invention, leaf guiding and supporting devices are provided, cooperating with the breaking or starting device shown in Figs. 15, 16 and 17, and already described. These supporting and guiding devices for the leaf are shown in Figs. 18 and 19 in their relation to certain other parts of the machine previously described and to which the same reference numerals are applied as in the preceding figures.

As embodied, a supporting and guiding plate for the underside of the leaf is provided, having a downwardly extending supporting flange 215, bolted on the machine frame. The guide proper 216 extends transversely outwardly from the flange, and its forward or leaf-receiving end 217 is curved downwardly past the upper or leaf-feeding reach of the sprocket chain 44, to make certain that the fed-in leaf will come above the support 216, in the manner shown in Fig. 19. The way in which the leaf is supported during the breaking operation is clearly shown from Figs. 18 and 19. The inner end of the support 216 is curved somewhat upwardly, as shown at 218 to present the leaf at an advantageous level or direction to the rotating stemming devices.

A guiding plate cooperating with the foregoing is preferably provided, such a plate 220 being bolted or riveted to a support 221 carried by the shaft 29. The plate 220 is bent downwardly from said support, and its outer end is sufficiently elevated above the lower or leaf-feeding reach of the sprocket chain 27 to insure the fed-in leaf passing beneath the guide plate. The portion 222 of the guiding plate, which is in line with the breaking or starting device, is slightly below the corresponding part of the guide and support 216, as will clearly appear from Figs. 18 and 19.

Thus, as shown in Fig. 19, the leaf is firmly supported underneath at the time and place of the breaking or starting operation, which is the preliminary for the main stemming operation, and the body of the leaf is held deflected downwardly out of the way of the breaking or starting by the guide 222. By so supporting and deflecting the leaf downwardly and out of the line of action of the breaker, a limited length only of the leaf is exposed or subjected to the breaker action. This prevents to a very great extent scrapping of the leaf and the formation of ragged edges, which are made by the wire fingers of the breaker if they are allowed to continue in engagement with the leaf at too great a distance from the butt.

The operation of the machine may be summarized as follows: A bundle or "hand" of tobacco leaves is thrown onto the traveling conveyor 1 substantially at right angles thereto with the butt ends toward and in contact with the guide plate 25. When necessary the operator moves any leaves until the butt or stem engages the guide plate 25. The leaves lying across the traveling conveyor 1 are carried by it to the right, Figs. 1, 2 and 18, until the stem butts are carried between and gripped by the two chains 27 and 44, which travel in the directions indicated by the arrows.

While the butt ends of the leaves are held by the chains 27 and 44, the leaves are subjected to three operations, namely, a breaking through operation, an operation for removing any leaves with broken stems, and a stripping or stemming operation; each operation will now be described.

The breaking through operation is for causing a preliminary loosening or separation between the stem and the base of the leaf, so that the stripping device can more readily strip the leaf from the stem. This breaking through device is illustrated in one form in Figs. 1 and 4, and in another form in Figs. 15, 16 and 17. Both forms are mounted on the rotating shaft 70. In the first form, shown in Figs. 1 and 4, the breaking through is accomplished by the wires 80 and brush 83 coming into forcible contact with that portion of the leaf near the butt end that is moving along the guide plate 85, the butt end itself being meanwhile firmly held between the traveling chains 27 and 44. In the second form, Figs. 18 and 19, the butt ends of the leaves are gripped between the traveling chains 27 and 44, while the portion of the leaf that it is desired to break from the stem moves along on top of the guide plate 216, the rest of the leaf being under the guide plate 222. The breaking through is accomplished by the forcible contact of the wires 194 and 211, the bristles 202 and the strips 195, with that portion of the leaf on the guide plate 216.

The second operation is that of removing any leaves with broken stems, so that the stripping brushes will not remove the broken portion, stem and leaf, and mix it with the stripped leaf. The leaves, broken through or loosened at the base by the first operation and still carried by their butt ends between the chains 27 and 44, are subjected to a light brushing action from underneath by the brushes 94 sufficient to remove broken leaves and throw them into a suitable chute.

The third operation is the stemming or stripping operation. The leaves with their butt ends still carried by the chains 27 and 44, now move in between the upper set of rotating knives and brushes and the lower set of oppositely rotating stripping plates and knives, illustrated in Figs. 6, 7 and 8 in one form, and in Figs. 20, 21 and 22 in a slightly modified form. This device, by means of the cooperating knives 148 and 149, cuts the stem near the outer end of the leaf at a point where the stem is so small as to be unobjectionable if mixed with the leaf, and by means of the plates 114 and brushes 124 strip and remove the leaf from the stem and drop the leaf portion into a suitable chute or receptacle.

This practically completes the operation. The stripped stems would continue to the right until released by the separation of the chains 27 and 44 to drop into a suitable receptacle.

However, the stripped stems may be subjected to a still further cleaning operation for removing small residual portions of leaf that may have resisted the stripping device. To this end, the stripped stems are delivered by the chains 27 and 44 to the chains 153 and 154, Fig. 12, which carry them into operative engagement with the rotating stripper 180, Fig. 14, which removes any residual leaf. The cleaned stems continue to the right until released by the separation of the chains 153 and 154.

It will be observed that in the present case, the leaf is stripped in what is substantially a continuous, uni-directional operation, while the leaf is held by a single holding means. As is well known, in stripping, the point of greatest difficulty is to separate the lamina at and near the point where it merges into the thick part of the stem. At this point the connection is thick, strong, and inclined wrongly to permit efficient stripping away from the butt. Stripping in this direction presses the lamina connection close to the stem, and in the usual method instead of separating the lamina from the stem, the lamina is torn, and a considerable portion is left in tatters. Furthermore the treatment of this portion of the lamina requires and permits the use of harsher methods than is required or permissible with the remainder of the lamina, and of mechanism which is not fitted for the treatment of the remaining portion, since it will cause unnecessary and undesirable mutilation of the lamina. After the initial separation or breaking of the lamina at or near the point where it merges into the stem, milder methods and mechanism may be used to complete the separation, The invention in its broader aspects is not limited to the specific mechanisms shown and described but departures may be made therefrom within the scope of the accompanying claims without departing from the principles of the invention and without sacrificing its chief advantages.

What I claim is:—

1. A tobacco leaf stemming machine including in combination means for grasping the stem butts just beyond the lamina, means including a dentated member operating away from the butt for breaking through the lamina at either side of the stem where the lamina starts from the stem butt, and stemming means for separating the lamina from the stem beginning at said break and progressing toward the point of the leaf.

2. A tobacco leaf stemming machine including in combination means for grasping the stem butts just beyond the lamina, means operating intermittently away from the butt for breaking through the lamina at either side of the stem where the lamina starts from the stem butt, and stemming means for separating the lamina from the stem beginning at said break and progressing toward the point of the leaf.

3. A tobacco leaf stemming machine including in combination means for grasping the stem butts just beyond the lamina, means including an intermittently operating lamina puncturing member operating away from the grasping means for breaking through the lamina at either side of the stem where the lamina starts from the stem butt, and stemming means for separating the lamina from the stem beginning at said break and progressing toward the point of the leaf.

4. A tobacco leaf stemming machine including in combination means for grasping the stem butts just beyond the lamina, rotary means for breaking through the lamina at either side of the stem where the lamina starts from the stem butt, said means moving away from the butt where it engages the leaf and stemming means for separating the lamina from the stem beginning at said break and progressing toward the point of the leaf.

5. A tobacco leaf stemming machine including in combination means for grasping the stem butts just beyond the lamina, rotary intermittently operating puncturing means working away from the butt where it engages the leaf for breaking through the lamina at either side of the stem where the lamina starts from the stem butt, and stemming means for separating the lamina from the stem beginning at said break and progressing toward the point of the leaf.

6. A tobacco stemming mechanism including in combination, means to break through the lamina at either side of the stem near where the lamina starts from the stem butt, and means including rotary devices for separating the lamina from the stem beginning at said break, and progressing toward the point of the leaf, said means arranged to operate in succession, and means to grasp a succession of stem butts just beyond the lamina, and transport them past the said means, thereby to be successively operated upon.

7. A tobacco leaf stemming machine including in combination leaf conveying means for grasping the stem butt just beyond the lamina and traveling it past a succession of independent stemming means, one of means located closely adjacent to the leaf conveying means for breaking through the lamina of the conveyed leaf on either side of the stem where the lamina starts from the stem butt, and the other of said stemming means acting subsequently on the traveling leaf for separating the lamina from the stem beginning at the break and progressing toward the point of the leaf.

8. A tobacco leaf stemming machine including in combination leaf conveying means for grasping the stem butt just beyond the lamina and traveling it past the stemming means, the first of said means located closely adjacent to the leaf conveying means including an intermittently operating puncturing device for breaking through the lamina of the conveyed leaf on either side of the stem where the lamina starts from the stem butt, and the succeeding stemming means acting subsequently on the traveling leaf for separating the lamina from the stem beginning at the break and progressing toward the point of a succession of leaf.

9. A tobacco leaf stemming machine including in combination leaf conveying means for grasping the stem butt just beyond the lamina and traveling it past a succession of stemming means, the first of said means located closely adjacent to the leaf conveying means operating in a direction transverse to the line of travel of the conveying means and away from the butt for breaking through the lamina of the conveyed leaf on either side of the stem where the lamina starts from the stem butt, and the succeeding stemming means acting subsequently on the traveling leaf for separating the lamina from the stem beginning at the break and progressing toward the point of the leaf.

10. A tobacco leaf stemming machine including in combination means for grasping and holding a leaf by its stem butt, and lamina puncturing means including a support having an edge and a puncturing member operating on the lamina at the edge of said support.

11. A tobacco leaf stemming machine including in combination means for grasping and holding a leaf by its stem butt, and lamina puncturing means including a support having an edge and a puncturing member operating on the lamina at the edge of said support and on either side of the stem.

12. A tobacco leaf stemming machine including in combination means for grasping and holding a leaf by its stem butt, and lamina puncturing means including a support having an edge and a rotary puncturing member operating on the lamina at the edge of said support.

13. A tobacco leaf stemming machine including in combination means for grasping and holding a leaf by its stem butt, and lamina puncturing means including a support having an edge and a rotary intermittently operating puncturing member operating on the lamina at the edge of said support and on either side of the stem.

14. A tobacco leaf stemming device including in combination means for holding the leaf and cooperating stemming devices including a rotating plate presenting its edge to stem the lamina and a group of rotating bristles, disposed tangentially to their path of rotation and sweeping over said plate and past its edge during the stemming action.

15. A tobacco leaf stemming device including in combination means for holding the leaf and cooperating stemming devices including a rotating grooved plate presenting its edge to stem the lamina and a group of rotating bristles, disposed tangentially to their path of rotation and sweeping over said plate and past its edge during the stemming action.

16. A tobacco leaf stemming machine, including in combination means to break the leaf lamina from the stem at and near the point where it merges into the stem, and means to support a leaf in position for engagement by the breaking means at the selected point, and including means to deflect the leaf to limit the extent of the action of the breaking means thereon.

17. A tobacco leaf stemming machine including in combination a breaker having a plurality of relatively rigid lamina-breaking fingers and a resilient device cooperating therewith during the breaking action.

18. A tobacco leaf stemming machine including in combination a breaker having a plurality of relatively rigid lamina-breaking fingers and a resilient device upon which the fingers are mounted and cooperating therewith during the breaking action.

19. A tobacco leaf stemming machine including in combination a stemming device including a shaft, a group of yielding leaf-stemming members supported upon and disposed longitudinally of the shaft and tangentially to their circular path about the shaft.

20. A tobacco leaf stemming machine including in combination a stemming device including a shaft, a group of yielding leaf-stemming members supported upon and disposed longitudinally of the shaft and tangentially to their circular path about the shaft and a cooperating stemming member with which said leaf stemming members engage at an obtuse angle.

In testimony whereof, I have signed my name to this specification.

JAMES P. SCOVILL.